Oct. 25, 1927.

J. W. HURST 1,646,585

TROLLEY RETRIEVER

Filed March 8, 1926

INVENTOR,
John W. Hurst
By his Attorneys

Patented Oct. 25, 1927.

1,646,585

UNITED STATES PATENT OFFICE.

JOHN WESTLEY HURST, OF MINNEAPOLIS, MINNESOTA.

TROLLEY RETRIEVER.

Application filed March 8, 1926. Serial No. 92,995.

My invention relates to trolley retrievers for electric cars and the like and has for its object to improve the same in the several particulars hereinafter noted.

As is well known, standard electric cars have trolleys arranged to run on trolley wires and are yieldingly held in contact therewith, and which trolleys have ropes attached near their free ends for use in pulling the trolley from the trolley wire and for placing the same thereon. Such trolley ropes are usually attached to retrievers on the bodies of the cars. The purpose of a retriever is to yieldingly take up slack in a trolley rope, and in case the trolley jumps the trolley wire the retriever will automatically wind up the trolley rope to hold the trolley down and prevent the same from being damaged by swinging back and forth and from tearing down the trolley wire or its supporting members.

To the above end, the invention consists of the novel devices and combinations of devices hereinafter described and defined in the claims.

In the accompanying drawings, which illustrate the invention, like characters indicate like parts throughout the several views.

Referring to the drawings.

Figure 1:
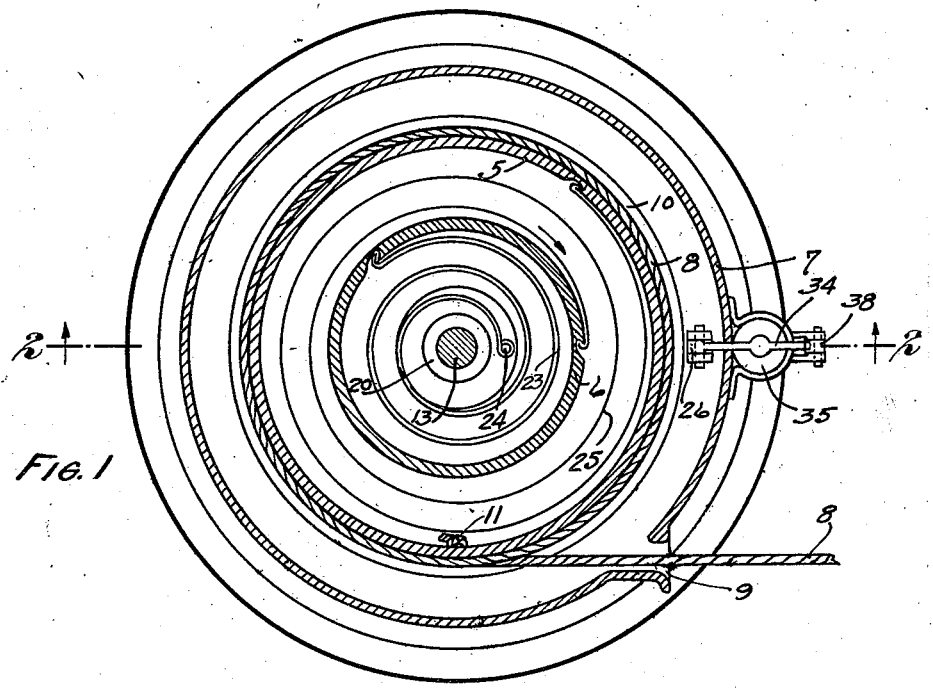
Fig. 1 is a view principally in section taken on the line A—A of Fig. 2.

The numerals 5 and 6 indicate, respectively, outer and inner concentric drums in a two-part casing 7 adapted to be secured to the body of a car or other support. A trolley rope 8 enters the casing 7 through a bossed opening 9 and is wound on the drum 5 between its peripheral flanges 10 and attached thereto at 11. One end of the drum 5 is closed by a head 12, and diametrically formed with said head is a shaft 13 that extends axially through said drum. Integrally formed in the drum head 12 at the adjacent end of the shaft 13 is a short heavy trunnion 14 journaled in a hub 15 formed with the casing 7. The other end of the shaft 13 is journaled in a bushing 16 mounted in a hub 17 formed with the casing 7 and secured thereto by a screw 18.

The end of the drum 6 adjacent to the drum head 12 is closed by a head 19 with which is formed a bearing sleeve 20 mounted on the shaft 13 and supports the drum 6 therefrom for rotation within the drum 5 and in respect thereto. Formed with the open end of the drum 6 is an outwardly and radially extended annular flange 21 that closes the open end of the drum 5 and has formed in its periphery a plurality of circumferentially spaced lock notches 22. A relatively heavy wound coiled spring 23 has one of its ends anchored to a peg 24 secured to the bushing 16 and its other end is attached to said drum for rotating the same. Between the drums 5 and 6 is a relatively light wound coiled spring 25 having one of its ends attached to the drum 5 and its other end attached to the drum 6.

A dog 26 pivoted to the casing 7 is arranged to be moved into interlocking engagement with any one of the lock notches 22 to hold the drum 6 against rotation under the action of the spring 23. When the drum 6 is thus locked, the same becomes a base of resistance for the spring 25. By rotating the drum 6 by means of its flange 21 the spring 23 may be placed under the desired tension and held where set by the dog 26.

The function of the spring 23, when released by the movement of the dog 26 out of engagement with the respective lock notch 22, is to rotate the drum 5 and wind the trolley rope 8 thereon when the trolley to which the rope is attached jumps the trolley wire on which it runs and thereby draws the trolley down below said wire. Normally the drum 5 is free to rotate in respect to the drum 6 and the function of the spring 25 is to rotate said drum 5 to take up the slack in the rope 8. The tension of the spring 25 is such that there is no tendency to pull the trolley from the trolley wire and when the trolley moves upward the action thereof will unwind the rope 8 from the drum 5 against the tension of the spring 25.

To automatically connect the drum 5 to the drum 6 under the rotation of the drum 6 to wind the rope 8 on the drum 5 under the action of the spring 23 when said drum 6 has been released by the dogs 26 there is pivoted to the inner drum head 19 a pair of dogs 27 arranged to be thrown outward under centrifugal force to engage internal lock notches formed in the drum head 12. It will be noted that the drum head 12 is recessed at 28. A coiled spring 29 is mounted in a pocket in the casing 7, engages the dog 26 and is under tension to move the same out of the lock notch 22 with which it engages.

Figure 2:
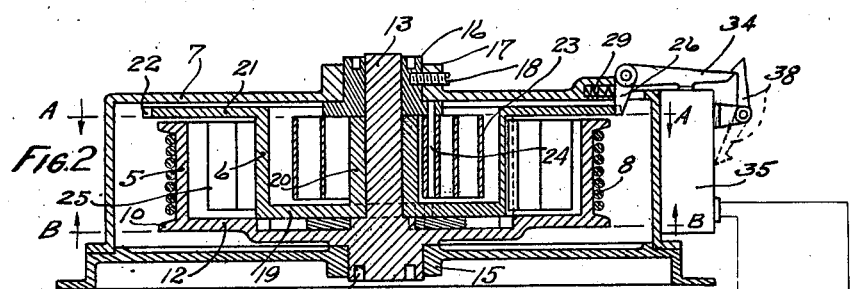
Fig. 2 is a view principally in section taken on the line 2—2 of Fig. 1 and also showing a wiring diagram.
Figure 3:
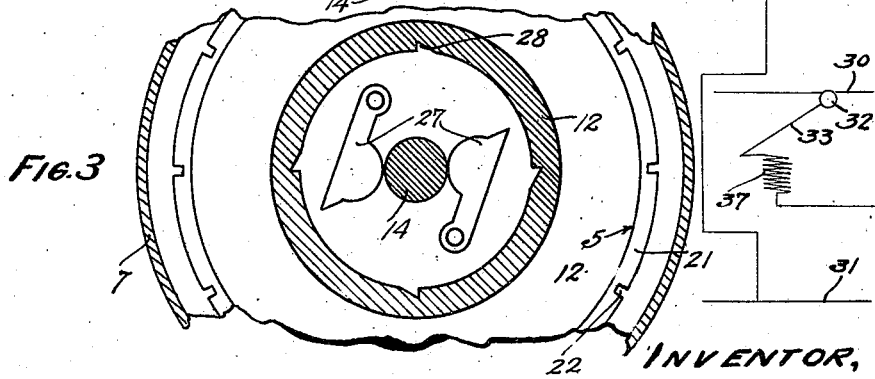
Fig. 3 is a fragmentary view with some parts sectioned on the line B—B of Fig. 2.

Referring now to the wiring diagram shown in Fig. 2 the numerals 30 and 31 indicate, respectively, a trolley wire and a rail or ground, and the numeral 32 indicates a trolley engaging the trolley wire 30, and a trolley circuit to the motor of a car is indicated by the numeral 33.

To normally hold the dog 26 locked with one of the lock notches 22 and hold the drum 6 against the tension of the spring 29 there is provided an electromagnetic dog retainer in the form of an armature 34 secured to the dog 26 in bell crank arrangement and a magnet 35. One of the wires 36 of the circuit for the magnet 35 is connected to the trolley circuit 33 and has interposed therein a relay 37, and the other wire thereof leads to the rail or ground 31.

The magnet 35 is constantly energized as long as the trolley 32 is in contact with the trolley wire 30 and the energized magnet 35 holds the armature 34 thereon with the dog 26 interlocked with one of the lock notches 22. In case the trolley 32 should jump the trolley wire 30 or be pulled therefrom by the rope 8 the magnet 35 will be de-energized by the breaking of the trolley circuit 33 and release the armature 34. Upon the releasing of the armature 34 the spring 29 will move the dog 26 out of the lock notch 22 with which it is interlocked and thereby release the wound spring 23 which rotates the drum 6. Under the rotation of the drum 6 the dogs 27 are drawn outward by centrifugal force, engage the lock notches 28 and thereby connect the drum 5 to the drum 6 for common rotation therewith. Under the rotation of the drum 5 the rope 8 is wound on the drum 5 and will hold the trolley down.

To replace the trolley 32 on the wire 30 the rope 8 is manually pulled from the casing 7 which unwinds the same from the drum 5 and thereby rewinds the spring 23 and again puts the same under tension. When the trolley 32 is again on the trolley wire the magnet 35 is energized, draws the armature 34 thereon, which in turn moves the lock dog 26 into one of the lock notches 22.

To hold the lock dog 26 interlocked with one of the lock notches 22 when the magnet 35 is de-energized there is pivoted to a bracket on said magnet a latch 38 arranged to be turned into interlocking engagement with the free end of the magnet 35, as shown by full lines in Fig. 2.

What I claim is:

1. A trolley retriever including a drum, a cable attached to the drum, power means for rotating the drum to wind the cable thereon and having a lock member, a dog operative on the lock member to hold the power means idle, means tending to release the dog, in combination with an electromagnetic retainer for holding the dog operative, said retainer being connected to and normally energized by the trolley circuit and operative to release said dog when de-energized by the breaking of the trolley circuit, and a latch for positively holding the dog operative.

2. The structure defined in claim 1 in which the armature of said electromagnetic means is carried by the dog and in which the latch is operative on said armature.

3. A trolley retriever including a casing, inner and outer relatively rotatable drums, the former within the latter, a cable attached to the outer drum, a spring for rotating the inner drum, a dog normally holding the inner drum with its spring under tension, means tending to release the dog, a clutch for automatically connecting the outer drum to the inner drum when said inner drum is released by the dog, and a second spring for rotating the outer drum to take up slack in the cable, in combination with an electromagnetic retainer for holding the dog operative, said retainer being connected to and normally energized by the trolley circuit and operative to release the dog when de-energized by the breaking of the trolley circuit.

4. A trolley retriever including a casing, inner and outer relatively rotatable drums, a cable attached to the outer drum, a wound spring attached to the casing and operative on the inner drum to rotate the same, said inner drum having an annular lock flange with a notched periphery, a dog cooperating with the notched periphery of the lock flange to hold the spring wound, a spring tending to release the dog, a centrifugal clutch for connecting the outer drum to the inner drum, a wound spring connecting the outer drum to the inner drum for operating said outer drum to take up slack in the cable, and an electromagnetic retainer for the dog including an armature on the dog in bell crank arrangement, said retainer being connected to and normally energized by the trolley circuit to release said dog when de-energized by the breaking of the trolley circuit.

5. The structure defined in claim 4 in further combination with a latch on the casing arranged to engage the said armature and hold the dog operative.

In testimony whereof I affix my signature.

JOHN WESTLEY HURST.